(12) United States Patent
Hunt

(10) Patent No.: US 9,901,073 B2
(45) Date of Patent: Feb. 27, 2018

(54) DISPOSABLE PET WATER BOTTLE AND BOWL COMBINATION

(71) Applicant: Jamie Hunt, Bellevue, MI (US)

(72) Inventor: Jamie Hunt, Bellevue, MI (US)

( * ) Notice: Subject to any disclaimer, the term of this patent is extended or adjusted under 35 U.S.C. 154(b) by 151 days.

(21) Appl. No.: 15/099,626

(22) Filed: Apr. 15, 2016

(65) Prior Publication Data

US 2017/0295751 A1    Oct. 19, 2017

(51) Int. Cl.
   *A01K 7/00*        (2006.01)

(52) U.S. Cl.
   CPC ............. *A01K 7/005* (2013.01); *A01K 7/00* (2013.01)

(58) Field of Classification Search
   CPC ...... A01K 7/005; A45F 3/16; A45F 2003/205
   USPC ............................ 119/72, 74, 61.54, 61.56
   See application file for complete search history.

(56) References Cited

U.S. PATENT DOCUMENTS

| | | | | |
|---|---|---|---|---|
| 2,107,309 A * | 2/1938 | Smith | ............. | B65D 23/00 215/228 |
| 2,203,476 A * | 6/1940 | Trabold | ............. | B65D 23/00 220/717 |
| 2,778,521 A * | 1/1957 | Cagle | ............. | B65D 47/0895 215/228 |
| 3,021,977 A * | 2/1962 | Hester | ............. | B65D 47/06 215/387 |
| 4,109,650 A * | 8/1978 | Peclard | ............. | A61C 1/0084 222/162 |
| 4,146,154 A * | 3/1979 | Mastman | ............. | A47K 5/122 222/109 |
| 5,809,935 A * | 9/1998 | Kolterman | ............. | A01K 7/02 119/74 |
| 5,860,571 A * | 1/1999 | Gueret | ............. | B05B 11/00 222/153.06 |
| 5,992,702 A * | 11/1999 | Shapiro | ............. | A01K 7/00 222/192 |
| 6,101,974 A * | 8/2000 | Frohlich | ............. | A01K 7/00 119/51.5 |
| 6,209,737 B1 * | 4/2001 | Bliss | ............. | B65D 23/065 215/228 |
| 7,527,017 B1 * | 5/2009 | Cribb | ............. | A01K 7/005 119/51.5 |
| 7,634,973 B1 * | 12/2009 | Cribb | ............. | A01K 7/005 119/51.5 |
| 8,196,622 B1 * | 6/2012 | Fisher | ............. | B67C 11/02 141/330 |
| 8,689,987 B2 * | 4/2014 | Lewis | ............. | A61J 11/04 141/322 |
| 8,807,083 B1 * | 8/2014 | Ross | ............. | A01K 7/00 119/72 |

(Continued)

*Primary Examiner* — Ruth Ilan

(57) ABSTRACT

Disposable water bottle and bowl combination with water bottle having a cylindrical shape that transitions into a threaded neck at the top. The bowl has a round shape with a cylindrical, threaded, protrusion at its base. These units attach to one another by way of these threaded parts. A valve is present at the top of the threaded protrusion in the base of the bowl. This valve serves as a barrier to the water in the bowl when upright; and opens to allow liquid passage when the bowl is inverted. The bowl has a lid that can act as a flying disc toy when detached. The bottle and bowl may be used as a singular unit to offer water from the bowl, or the bottle and bowl may be used individually by detaching the bowl and using the bottle to fill, and replenish, the water in the bowl.

1 Claim, 6 Drawing Sheets

(56) References Cited

U.S. PATENT DOCUMENTS

| | | | | |
|---|---|---|---|---|
| 8,931,522 | B2* | 1/2015 | Paige | A45F 3/16 |
| | | | | 141/2 |
| D741,025 | S * | 10/2015 | Ross | D30/121 |
| 9,609,969 | B1* | 4/2017 | Panec | A47G 21/185 |
| 2002/0066677 | A1* | 6/2002 | Moscovitz | B65D 51/2835 |
| | | | | 206/219 |
| 2008/0115732 | A1* | 5/2008 | Stenberg | A01K 7/02 |
| | | | | 119/74 |
| 2010/0313817 | A1* | 12/2010 | Krasner | A01K 7/00 |
| | | | | 119/72.5 |
| 2010/0314418 | A1* | 12/2010 | Roth | B65D 41/26 |
| | | | | 222/205 |
| 2016/0050884 | A1* | 2/2016 | Ross | A01K 7/00 |
| | | | | 119/74 |
| 2016/0366852 | A1* | 12/2016 | Burroughs | A01K 7/00 |

* cited by examiner 103-1

103-2

DISPOSABLE PET WATER BOTTLE AND BOWL COMBINATION

BACKGROUND OF THE INVENTION

This invention relates to the field of portable, disposable water bottles.

Pets continue to be a constant and consistent companion in the lives of people. People travel, participate in activities, and attend events with their pets in tow. They have their pets join them, as a companion, on their daily routines and make time for activities of their pet's benefit, such as taking them on walks and to parks where they can run and play. While doing any of these activities, it is important that the pet have a means of staying hydrated. As it currently stands, there does not exist a convenient, portable and disposable means of providing hydration for a pet. Currently, one would need to remember to carry with them a dish for the pet to access water and means of filling the dish with water.

BRIEF SUMMARY OF THE INVENTION

This invention serves as a convenient and disposable means of providing a pet with portable water.

This invention provides the ability to hold the apparatus by the bottle in order to offer the pet water from the bowl, or detach the bowl from the bottle in order to place it for the pet's access. Either method utilizes the water stored in the bottle to fill, and replenish, the bowl with water.

The invention consists of a cylindrical bottle attached, by means of a threaded neck at the top of the bottle, to the bowl through a threaded protrusion at the base of the bowl. The bowl contains a circular valve at the top of the threaded protrusion that acts with gravity to keep the water from escaping the bowl. The bowl is then lidded for portability.

The attached drawings will serve in describing the invention and are drawn to facilitate an understanding of the invention.

DETAILED DESCRIPTION OF THE INVENTION

Figure 1:
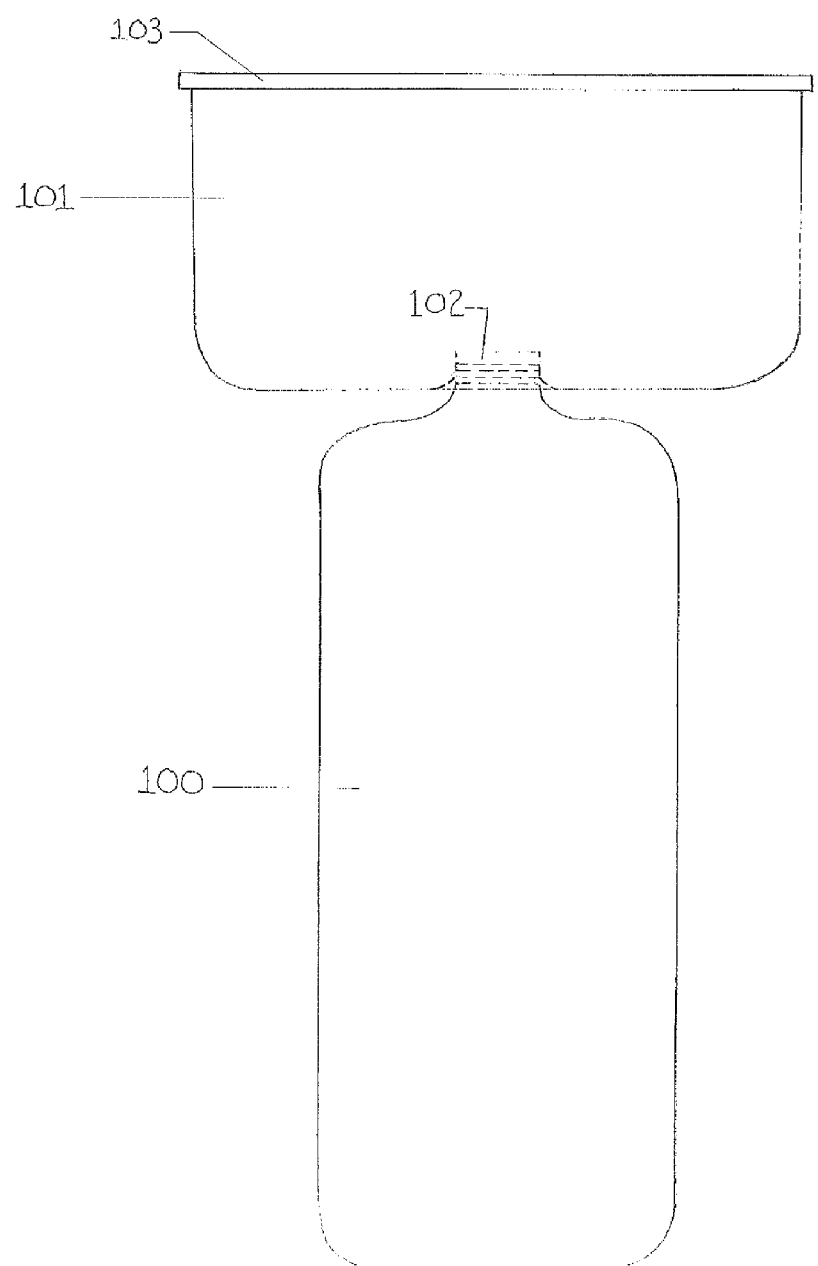
FIG. 1—Elevation View of the Invention, as a whole.
Figure 2:
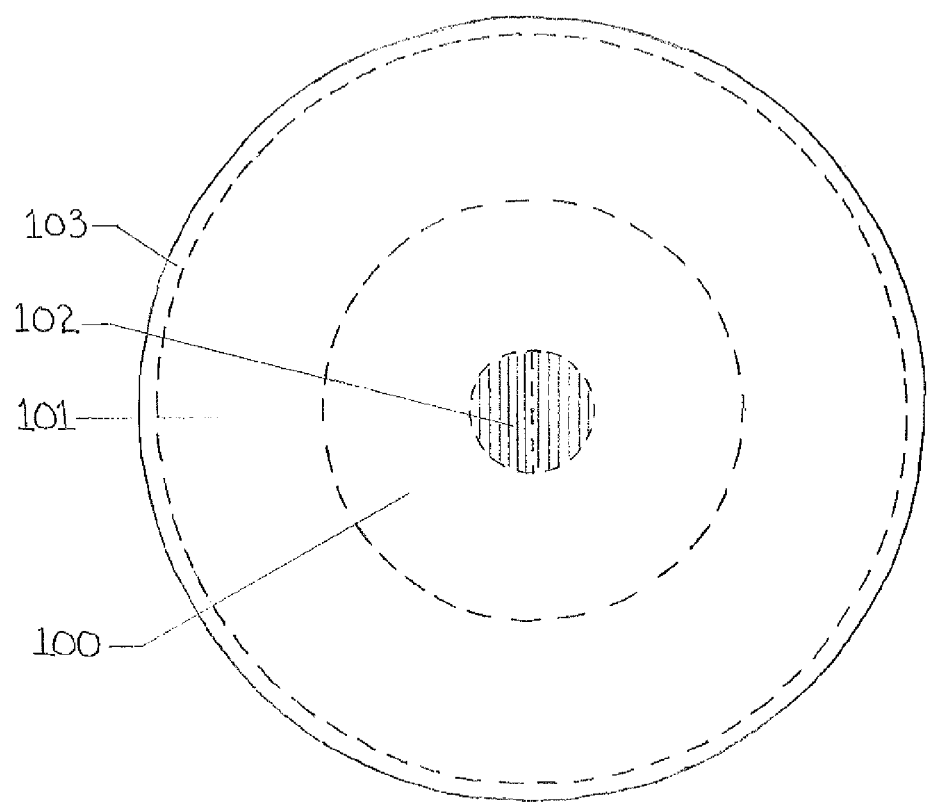
FIG. 2—Plan View of the Invention, as a whole.
Figure 3:
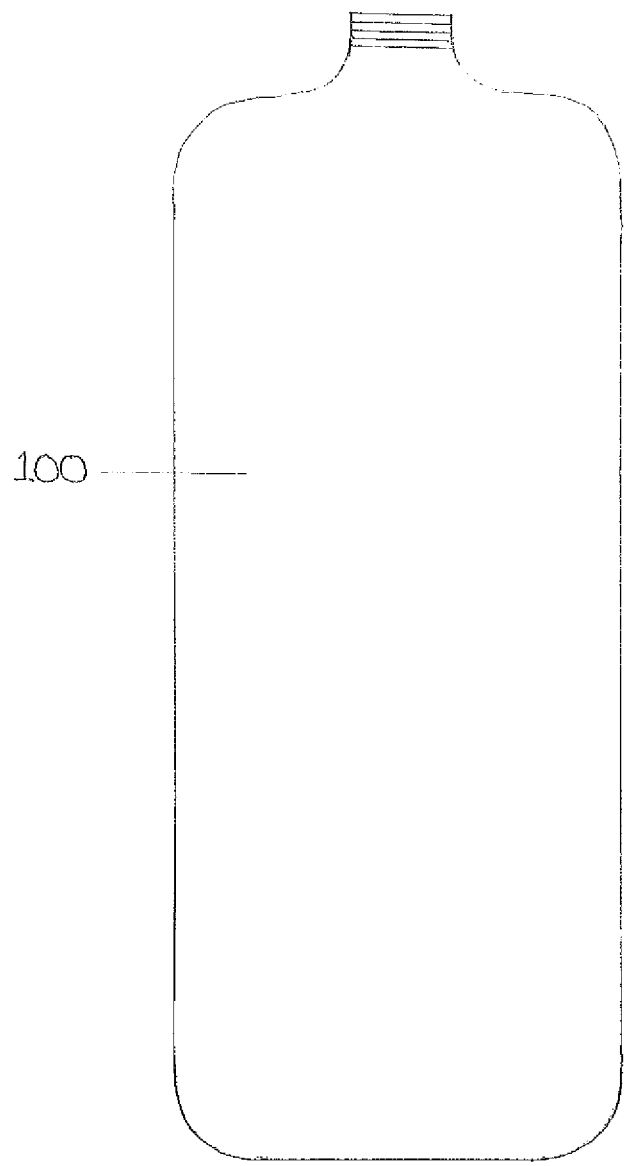
FIG. 3—Elevation View of the Bottle.
Figure 4:
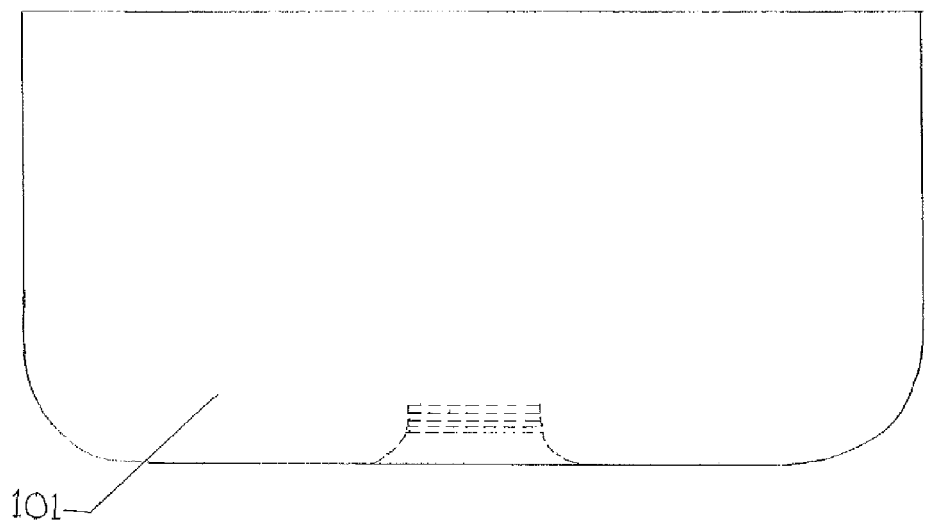
FIG. 4—Elevation View of the Bowl.
Figure 5A:
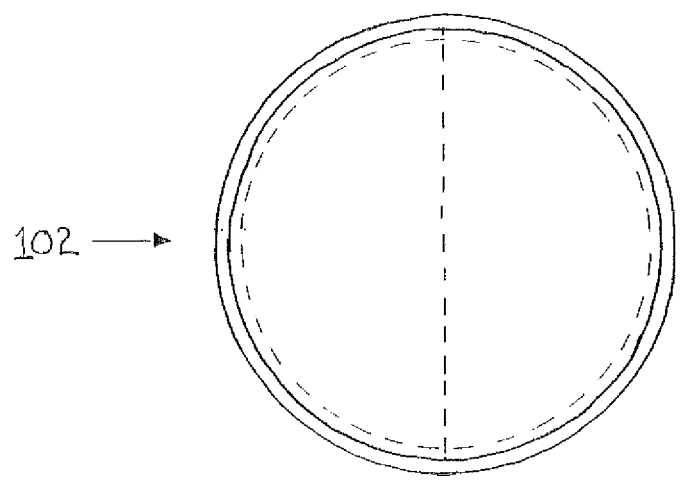
FIG. 5A—Plan View of the Gravity Valve.
Figure 5B:
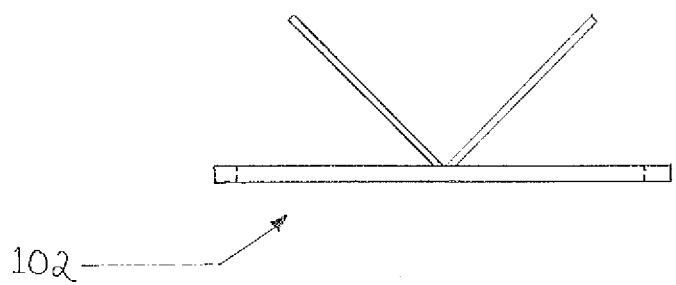
FIG. 5B—Elevation View of the Gravity Valve.
Figure 6:
FIG. 6—Elevation View of the Lid Options.
Figure 6:
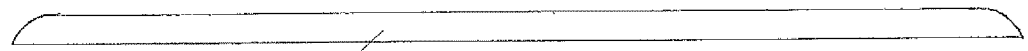

FIG. 1 is an elevation view of the water bottle and bowl combination, as referenced. The bottle 100 is cylindrical in shape and is terminated by a threaded neck at the top of the bottle, as is commonly found in existing water bottles. The bowl 101 is round in shape with a flat base and has a cylindrical protrusion located in the center of the base that extends into the bowl. The protrusion is of a just slight larger size than the threaded neck of the bottle 100, and is threaded on its inside. The bottle 100 attaches to the bowl 101 by means of the threaded neck of the bottle 100 being twisted into the threaded protrusion at the base of the bowl 101. At the top of this threaded protrusion in the bowl 101 is a circular valve 102 that acts by way of gravity, opening when the bowl 101 is inverted but remaining closed when the bowl 101 is in its typical, upright position. This valve 102 is what allows the water from the bottle 100 to enter into the bowl 101 when the two entities are attached and the bottle/bowl combination is inverted enough to allow the valve to open; but it prevents the water from escaping when the water has entered the bowl 101 and the bottle/bowl combination is returned to its typical, upright orientation. This valve 102 is also what prevents the water from escaping the bowl 101 when the bowl 101 is detached from the bottle 100 and used as a singular entity. Each side of the valve 102 can open as far as a ninety degree angle when inverted, by means of the material being hinged down the center of the valve disk, allowing passage of the liquid. The valve 102 remains closed when the bowl 101 is in the upright position by means of a lip on the perimeter of the valve casing, of which the valve disk sits. At the top of the bowl 101 is a detachable lid 103. This lid 103 may be attached and used as a barrier for the water when the bottle 100 and bowl 101 are attached together and the user is filling the bowl 101 with water from the bottle 100 by inverting the apparatus. The lid 103 may also be used simply for storage of the liquid in the bowl 101. More so, the lid 103 comes in two options, the first of which is a simple, thin, flat, circular lid with flat edges 103-1, in which the sole purpose is to serve as a barrier for the liquid in the bowl 101. The second option serves a dual purpose of acting as a barrier to the liquid when attached, or acting as a flying disc toy to the pet when detached. This lid 103-2 is also thin, flat and circular but has curved edges. This water bottle and bowl combination invention is made of a lightweight, but durable, material that will allow for limited reuse, if desired, or may be discarded otherwise; similar to that of common disposable water bottles.

The invention claimed is:

1. A disposable water bottle and bowl combination that consists of:
   a bottle with a cylindrical shape;
   a bowl with a round shape;
   wherein the bottle and the bowl are able to act as singular units to serve the needs of pet hydration, or in unity by means of a threaded neck at the top of the bottle and a threaded protrusion in the base of the bowl;
   a circular valve including a circular valve disk is contained within the top of the bowl protrusion that acts with gravity to retain any liquid in the bowl when in an upright position, but to allow liquid passage when inverted, by means of the disk material being hinged down the centerline of the circular valve disk;
   a circular lid caps the top of the bowl, acting as a means of storage when attached to the bowl and as a flying disc toy when detached from the bowl.

* * * * *